US011429891B2

(12) United States Patent
Liu et al.

(10) Patent No.: US 11,429,891 B2
(45) Date of Patent: Aug. 30, 2022

(54) METHOD TO IDENTIFY VIDEO APPLICATIONS FROM ENCRYPTED OVER-THE-TOP (OTT) DATA

(71) Applicant: AT&T Intellectual Property I, L.P., Atlanta, GA (US)

(72) Inventors: Yali Liu, Dublin, CA (US); Jin Wang, Fremont, CA (US); Zhengye Liu, Pleasanton, CA (US); Bruce Schine, San Leandro, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1184 days.

(21) Appl. No.: 15/914,057

(22) Filed: Mar. 7, 2018

(65) Prior Publication Data

US 2019/0279113 A1    Sep. 12, 2019

(51) Int. Cl.
| | | |
|---|---|---|
| *G06N 20/00* | (2019.01) | |
| *H04N 21/4408* | (2011.01) | |
| *H04N 21/44* | (2011.01) | |
| *H04L 9/40* | (2022.01) | |

(52) U.S. Cl.
CPC ......... *G06N 20/00* (2019.01); *H04L 63/0428* (2013.01); *H04N 21/44008* (2013.01); *H04N 21/4408* (2013.01)

(58) Field of Classification Search
CPC ......... H04N 21/44008; H04N 21/4408; G06N 20/00; H04L 63/0428
See application file for complete search history.

(56) References Cited

U.S. PATENT DOCUMENTS

| | | |
|---|---|---|
| 7,248,564 B1 | 7/2007 | Grosdidier et al. |
| 7,660,248 B1 | 2/2010 | Duffield et al. |
| 8,539,221 B2 | 9/2013 | Tremblay et al. |

(Continued)

FOREIGN PATENT DOCUMENTS

| | | |
|---|---|---|
| CN | 102271090 B | 9/2013 |
| CN | 105787512 A | 7/2016 |

(Continued)

OTHER PUBLICATIONS

"Definition of "vector" from te Dictionary.com", waybackmachine, Nov. 9, 2017, 4 pages.

(Continued)

*Primary Examiner* — Yassin Alata
(74) *Attorney, Agent, or Firm* — Guntin & Gust, PLC; Matthew Tropper (57) ABSTRACT

Aspects of the subject disclosure may include, for example, a processing system that performs operations including collecting encrypted network traffic flow data from user interaction with an application, deriving a first set of traffic feature vectors from the encrypted network traffic flow data collected, training a machine learning algorithm on the first set of traffic feature vectors to classify each traffic feature vector in the first set of traffic feature vectors as associated with a type of the application or not associated with the type of the application, and classifying whether an encrypted network traffic flow as the type of the application by applying the machine learning algorithm to a traffic feature vector of the encrypted network traffic flow. Other embodiments are disclosed.

20 Claims, 8 Drawing Sheets

(56) References Cited

U.S. PATENT DOCUMENTS

| | | | |
|---|---|---|---|
| 8,624,908 | B1 | 1/2014 | Knee et al. |
| 8,732,326 | B2 | 5/2014 | Murata et al. |
| 8,817,094 | B1 | 8/2014 | Reasoner et al. |
| 9,021,537 | B2 | 4/2015 | Peters et al. |
| 9,112,938 | B2 | 8/2015 | Tippin et al. |
| 9,191,284 | B2 | 11/2015 | Kordasiewicz et al. |
| 9,288,220 | B2 | 3/2016 | West et al. |
| 9,313,533 | B2 | 4/2016 | Zhang et al. |
| 9,349,102 | B2 | 5/2016 | Jin et al. |
| 9,350,785 | B2 | 5/2016 | Ahlawat et al. |
| 9,451,306 | B2 | 9/2016 | Sarukkai et al. |
| 9,491,078 | B2 | 11/2016 | Sailer et al. |
| 9,582,786 | B2 | 2/2017 | Gubin et al. |
| 9,583,140 | B1 | 2/2017 | Rady |
| 9,635,402 | B1 | 4/2017 | Toner et al. |
| 9,722,936 | B2 | 8/2017 | Zhou et al. |
| 9,740,278 | B2 | 8/2017 | Baldwin et al. |
| 9,813,310 | B1 | 11/2017 | Sieracki et al. |
| 10,452,993 | B1 * | 10/2019 | Hart .................. G06F 16/13 |
| 2005/0138658 | A1 | 6/2005 | Bryan et al. |
| 2005/0193414 | A1 | 9/2005 | Horvitz et al. |
| 2008/0310814 | A1 | 12/2008 | Bowra et al. |
| 2010/0164731 | A1 | 7/2010 | Xie et al. |
| 2010/0208064 | A1 | 8/2010 | Liu et al. |
| 2012/0084392 | A1 | 4/2012 | Lipfert et al. |
| 2012/0117225 | A1 | 5/2012 | Kordasiewicz et al. |
| 2012/0159558 | A1 | 6/2012 | Whyte et al. |
| 2014/0189735 | A1 | 7/2014 | Cudak et al. |
| 2014/0321290 | A1 | 10/2014 | Jin et al. |
| 2015/0161518 | A1 | 6/2015 | McCann et al. |
| 2016/0364606 | A1 | 12/2016 | Conway et al. |
| 2017/0070781 | A1 | 3/2017 | Bar Yanai et al. |
| 2017/0085617 | A1 | 3/2017 | Bovik et al. |
| 2017/0093648 | A1 | 3/2017 | ElArabawy et al. |
| 2017/0111672 | A1 | 4/2017 | Ramamurthy et al. |
| 2017/0126528 | A1 | 5/2017 | Padmanabhan et al. |
| 2017/0181037 | A1 | 6/2017 | Zaghloul |
| 2017/0188102 | A1 | 6/2017 | Zhang et al. |
| 2017/0259177 | A1 | 9/2017 | Aghdaie et al. |
| 2018/0115567 | A1 * | 4/2018 | El-Moussa ............ G06F 17/141 |
| 2018/0139214 | A1 * | 5/2018 | Anderson ........... H04L 63/1408 |
| 2018/0212992 | A1 * | 7/2018 | Nikolaev ............. H04L 67/306 |
| 2019/0028766 | A1 | 1/2019 | Wold et al. |
| 2019/0281333 | A1 | 9/2019 | Liu et al. |
| 2020/0267425 | A1 | 8/2020 | Liu et al. |
| 2022/0014802 | A1 | 1/2022 | Liu et al. |

FOREIGN PATENT DOCUMENTS

| | | | |
|---|---|---|---|
| CN | 105897736 | A | 8/2016 |
| EP | 2211504 | A1 | 7/2010 |
| WO | 2016115319 | A1 | 7/2016 |
| WO | 2016151419 | A1 | 9/2016 |
| WO | 2017102031 | A1 | 6/2017 |
| WO | 2017221152 | A1 | 12/2017 |

OTHER PUBLICATIONS

"Rouse "DCE (Distributed Computing Environment)"", TechTarget Network, Apr. 2007, 3 pages.

Alshammari, Riyad et al., "Machine Learning Based Encrypted Traffic Classification: Identifying SSH and Skype", Computational Intelligence for Security and Defense Applications, 2009, CISDA 2009, IEEE Symposium, IEEE, 2009., 2009, 8 pages.

Bakhshi, Taimur, "On Internet Traffic Classification: A Two-Phased Machine Learning Approach", Journal of Computer Networks and Communications, vol. 2016, Article ID 2048302, 2016, 1-22.

Balachandran, et al., "Developing a predictive model of quality of experience for internet video", 2013, 12 pages.

Bar-Yanai, Roni et al., "Realtime Classification for Encrypted Traffic", International Symposium on Experimental Algorithms, Springer, Berlin, Heidelberg, 2010., 2010, 373-385.

Hongzi, Mao, "Neural adaptive video streaming with pensieve", 2017, 59 pages.

Horovitz, et al., "Maxtream: Stabilizing P2P streaming by active prediction of behavior patterns", 2009, 8 pages.

Liu, Yali, "Method for Intelligent Buffering for Over the Top (OTT) Video Delivery", U.S. Appl. No. 15/916,656, filed Mar. 6, 2018, 37 pages.

Mushtaq, et al., "Empirical study based on machine learning approach to assess the QoS/QoE correlation", 2012, 8 pages.

Nguyen, Thuy T. et al., "A survey of techniques for internet traffic classification using machine learning", IEEE Communications Surveys & Tutorials 10.4, 2008, 56-76.

Vladutu, Alina et al., "Internet Traffic Classification Based on Flows Statistical Properties With Machine Learning", International Journal of Network Management 27.3 (2017)., 2015.

Williams, Nigel et al., "A Preliminary Performance Comparison of Five Machine Learning Algorithms for Practical IP Traffic Flow Classification", ACM Sigcomm Computer Communication Review 36.5 (2006): 5-16., Oct. 2006, pp. 7-15.

Zander, Sebastian et al., "Automated Traffic Classification and Application Identification Using Machine Learning", Proceedings of the IEEE Conference on Local Computer Networks, 2005, 30th Anniversary, The IEEE Conference, IEEE, 2005., 8 pages.

Kos, M. et al., "Bandwidth allocation for BVR video service in high-speed networks based on adaptive filtering", MELECON '98, 9th Mediterranean Electrotechnical Conference Proceedings, pp. 688-692 vol. 2, (Cat. No. 98CH36056), Tel-Aviv, Israel; doi: 10.1109/MELCON.1998.699303., 1998, 5 pages.

Mohapatra, B. N. et al., "FFT and sparse FFT techniques and applications", 2017 Fourteenth International Conference on Wireless and Optical Communications Networks (WOCN), Mumbai, India, pp. 1-5, doi: 10.1109/WOCN.2017.8065859, 2017, 5 pages.

* cited by examiner

METHOD TO IDENTIFY VIDEO APPLICATIONS FROM ENCRYPTED OVER-THE-TOP (OTT) DATA

RELATED APPLICATION(S)

U.S. patent application Ser. No. 15/912,656, filed Mar. 6, 2018, by Liu et al., entitled "Method for Intelligent Buffering for Over The Top (OTT) Video Delivery." All sections of the aforementioned application(s) are incorporated herein by reference in its entirety.

FIELD OF THE DISCLOSURE

The subject disclosure relates to a method to identify video applications from encrypted over-the-top (OTT) data.

BACKGROUND

A large portion of digital network radio bandwidth is consumed by Internet video traffic. A mobility network operator may spend billions of dollars on purchasing radio resources. Efficient use of the purchased radio resources, especially video data, is warranted. Thus, it is important for Internet Service Providers (ISP) to classify Internet traffic passing through the ISP's network. Traditional application detection methods mainly use port numbers, Deep Packet Inspection (DPI), Internet Protocol (IP) address, Domain Name Server (DNS) or Server Name Indication (SNI) filtering. To classify traffic, Deep-Packet-Inspection (DPI) is often implemented in key network links and elements to extract application signatures from different packet headers, especially hypertext transport protocol (HTTP) and transport control protocol (TCP) headers, so as to classify network traffic by application and domain. However, these method can be easily bypassed or lose their power against secure hypertext transport protocol (HTTPS) traffic, because the encryption in HTTPS conceals traffic information, especially HTTP layer information, thus prevent DPI from accurately detecting application signatures for traffic classification, even just for video vs. non-video categorization. Encryption conceals transferred contents in network traffic, makes it difficult to forecast traffic growth, and hinders special video service management strategies on encrypted traffic.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a system to perform traffic classification with Machine Learning (ML) algorithms over the existing DPI data of OTT data. Other embodiments are described in the subject disclosure.

One or more aspects of the subject disclosure include a device, comprising: a processing system including a processor; and a memory that stores executable instructions that, when executed by the processing system, facilitate performance of operations, the operations comprising: collecting encrypted network traffic flow data from user interaction with an application; deriving a first set of traffic feature vectors from the encrypted network traffic flow data collected; training a machine learning algorithm on the first set of traffic feature vectors to classify each traffic feature vector in the first set of traffic feature vectors as associated with a type of the application or not associated with the type of the application; and classifying whether an encrypted network traffic flow is associated with the type of the application by applying the machine learning algorithm to a traffic feature vector of the encrypted network traffic flow.

One or more aspects of the subject disclosure include a machine-readable medium, comprising executable instructions that, when executed by a processing system including a processor, facilitate performance of operations, the operations comprising: collecting encrypted network traffic flow data from user interaction with an application; deriving a first set of traffic feature vectors from the encrypted network traffic flow data collected, wherein the encrypted network traffic flow data comprises a type of application; applying a generative model to the first set of traffic feature vectors to generate a second set of traffic feature vectors; training a machine learning algorithm on the second set of traffic feature vectors to classify each traffic feature vector in the second set of traffic feature vectors as associated with the type of application or not associated with the type of the application; and classifying whether an encrypted network traffic flow is associated with the type of application by applying the machine learning algorithm to a traffic feature vector of the encrypted network traffic flow.

One or more aspects of the subject disclosure include a method, comprising: receiving, by a processing system including a processor, encrypted network traffic flow data from user interaction with a video application; determining, by the processing system, a first set of traffic feature vectors from the encrypted network traffic flow data collected; applying, by the processing system, a generative model to the first set of traffic feature vectors to generate a second set of traffic feature vectors; training, by the processing system, a machine learning algorithm on the second set of traffic feature vectors to classify each traffic feature vector in the second set of traffic feature vectors as associated with the video application or not associated with the type of the application; and classifying, by the processing system, whether an encrypted network traffic flow is associated with the video application by applying the machine learning algorithm to a traffic feature vector of the encrypted network traffic flow.

Figure 1:
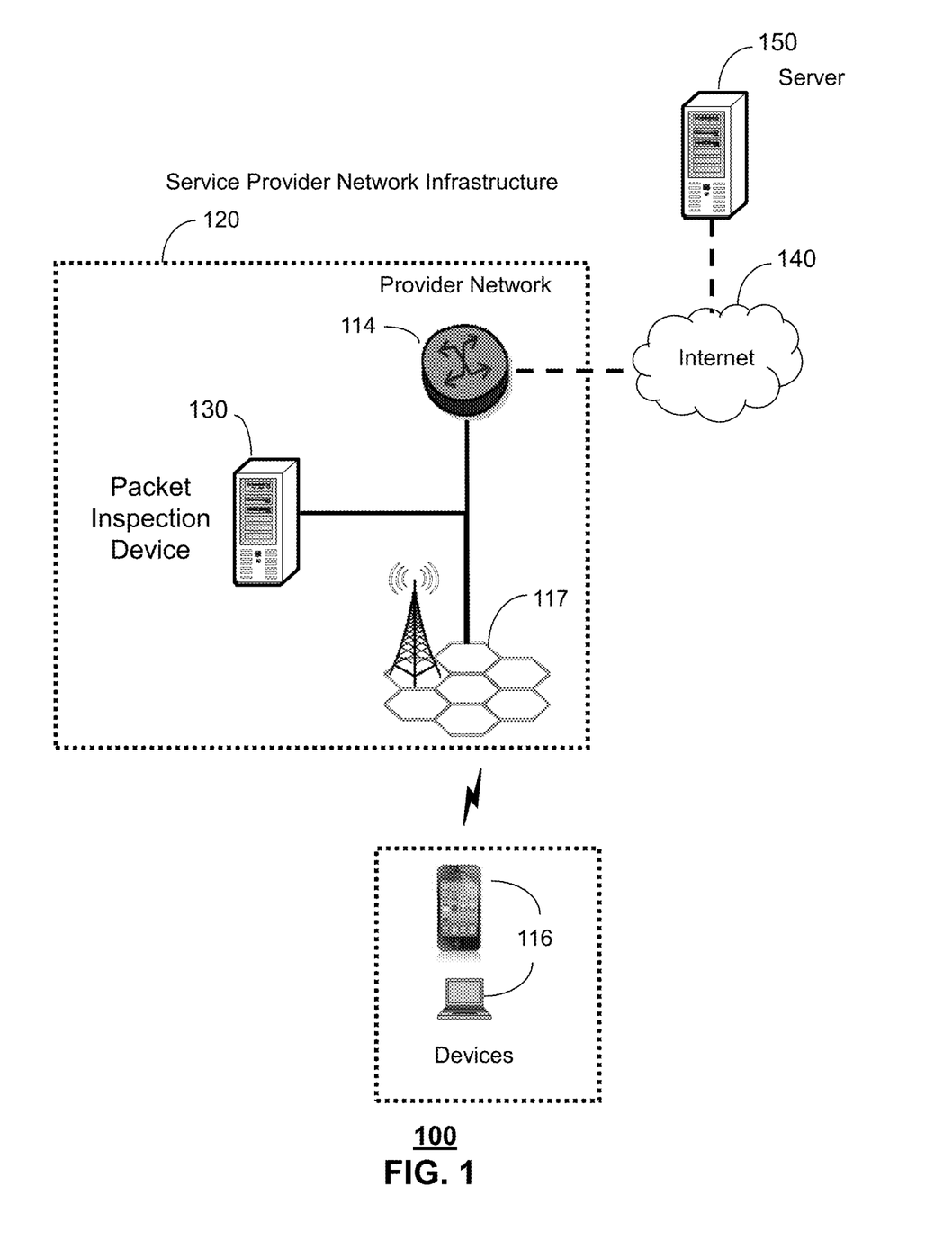
FIG. 1 depicts an illustrative embodiment of a system for identifying video applications from encrypted OTT data.

FIG. 1 depicts an illustrative embodiment of a system 100 for identifying video applications from encrypted OTT data. As shown, FIG. 1 illustrates a service provider network infrastructure 120 comprising a wireless access base station 117 operating according to common wireless access protocols and a provider network 114. The provider network 114 delivers data from one or more Internet servers 150 coupled to the Internet 140 to communication devices 116. Additionally, the service provider network infrastructure 120 incorporates a packet inspection device 130. In an embodiment, the communication devices 116 are in communication with the provider network 114 through a wireless access base station 117.

In an embodiment, a user of a communication device 116 may download data from an Internet server 150 over the Internet 140, through provider network 114 and wireless access base station 117. Such data may utilize an encrypted network mode of transmission, such as HTTPS transmitted by the Internet server 150 through the provider network 114 and wireless access base station 117 to the communication device 116.

A packet inspection device 130 having machine learning may be implemented in an embodiment, which learns how to classify network traffic flows, such as TCP connections. In one embodiment the packet inspection device 130 collects DPI data collected from production LTE network probes on an S 1U interface. Instead of using traffic signatures, e.g., content type information in HTTP headers, which is unavailable in HTTPS, the packet inspection device 130 uses traffic patterns, i.e., the time series of bytes transmitted in the network, to identify whether the traffic is a particular type of application traffic, such as video traffic. The rationale behind this approach is that (1) most video streaming services adopt either Dynamic Adaptive Streaming over HTTP (DASH) or Apple's HTTP Live Streaming (HLS) as the transmission protocol, (2) DASH/HLS has a unique traffic pattern than other types of Internet traffic, e.g., file downloading and web browsing, and (3) DASH/HLS's traffic pattern is robust, which is largely independent of video system implementation/configuration and network conditions. Importantly, no matter if HTTP or HTTPS is in use, the traffic pattern of DASH/HLS is uniformly identical.

Figure 2A:
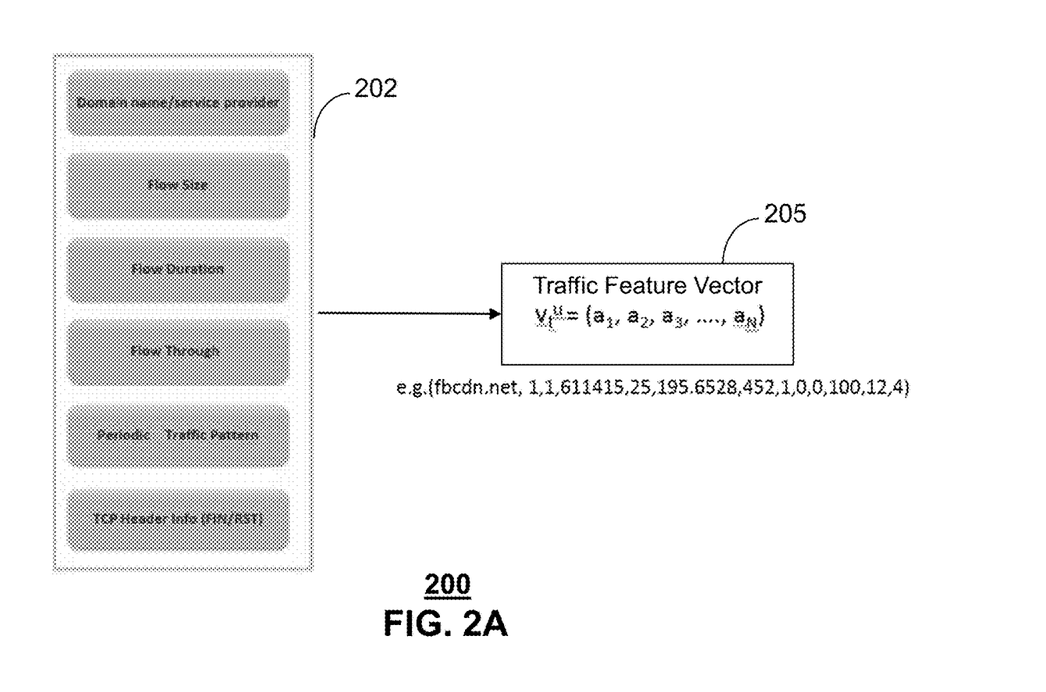
FIG. 2A depicts an illustrative embodiment of a data formation scheme to build a traffic feature vector.

FIG. 2A depicts an illustrative embodiment of a data formation scheme 200 to build a traffic feature vector. As shown in FIG. 2A, a select set of the traffic counters 202, e.g., domain name/service provider, flow size, flow duration, flow throughput, periodic traffic pattern and TCP flag info from the header, will be extracted from each individual TCP flow. Advanced signature processing, e.g., via Fast Fourier Transform (FFT) will be applied to map these counters to a vector (a1, a2, a3, . . . , aN), known as a traffic feature vector 205. Traffic feature vector 205 mimics application behaviors of a typical OTT application. In general, no matter what transmission schemes are used (HTTP or HTTPS), a traffic feature vector 205 uniquely represents the traffic patterns and robustly indicate the network dynamics.

Figure 2B:
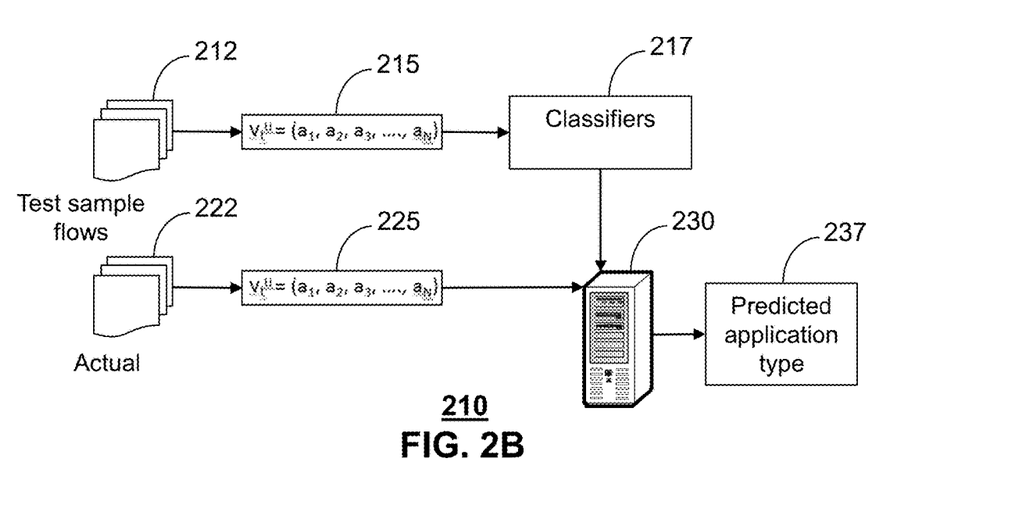
FIG. 2B depicts an illustrative embodiment of a system that identifies video applications from encrypted OTT data.

FIG. 2B depicts an illustrative embodiment of a system 210 that identifies video applications from encrypted OTT data. Network traffic flowing through a provider network 114 is observed by a packet inspection device 230 and used as input to the machine learning (ML) algorithm. As shown in FIG. 2B, a set of training data flows 212 are used by the packet inspection device 230 to create a plurality of traffic feature vectors 215. In one embodiment, training and test samples were collected from 7 regions, 12 network data control systems and 29 markets across an entire mobile network. The packet inspection device 230 uses the plurality of traffic feature vectors to create models through a ML algorithm. The plurality of traffic feature vectors 215 are used to train and build classification models, or classifiers 217 that may be incorporated in the packet inspection device 230. The classifiers 217 can be trained and tuned with the traffic feature vectors on encrypted sample flows through lab testing. In an embodiment, a classifier 217 having the best performance will be saved and used for traffic classification on actual encrypted traffic flows 222. Such classifier will be able to generate a predicted traffic application type 237 for each encrypted traffic flow based on the traffic feature vectors 225 determined from the actual encrypted traffic flows 222.

In more detail, for a certain video application with encrypted traffic (like FACEBOOK® video), extensive lab testing is needed to collect the "seeding" sample data as the absolute ground truth. As for certain (especially new) video applications, there may not always be unencrypted counterparts that fully mimic the traffic patterns and behaviors of the specific encrypted video applications. For example, FACEBOOK® video (which is encrypted) may have a very unique traffic pattern than other video applications (which are unencrypted). Thus, machine learning from unencrypted video traffic may not be applicable to encrypted FACEBOOK® video traffic.

Figure 2C:
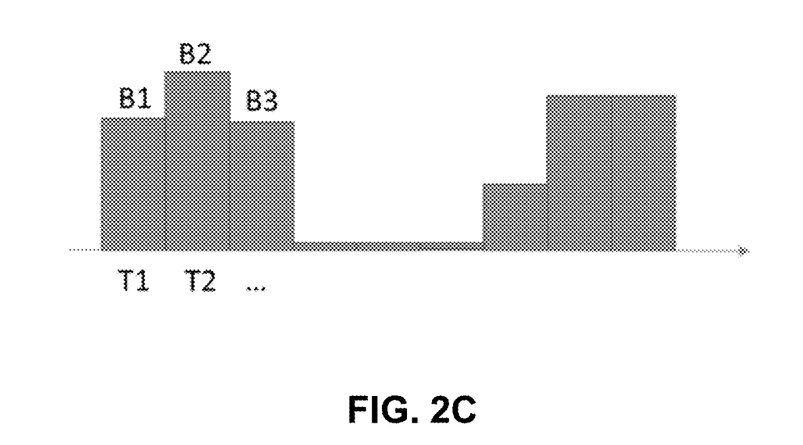
FIG. 2C depicts an illustrative embodiment of lab testing data.

FIG. 2C depicts an illustrative embodiment of lab testing data having a time series with a time slot granularity of T. The time granularity can be configurable. Bx indicates the number of bytes transmitted in time slot x. In an embodiment, this information may be extracted from lab testing data. If an application session contains multiple lower layer transport sessions, these transport sessions are aggregated to the application session. The input of the classifier is the individual time series of # of bytes data (i.e., a vector of # of bytes) of a given session, and the output of the model is whether the session is a video session, or not. Based on the traffic feature vectors derived from the traffic flow data (either video or non-video) shown in FIG. 2C that are collected from lab testing, generative models can be used to generate a much larger set of traffic feature vectors (that are either video or non-video) with simulations and/or statistic models.

Figure 2D:
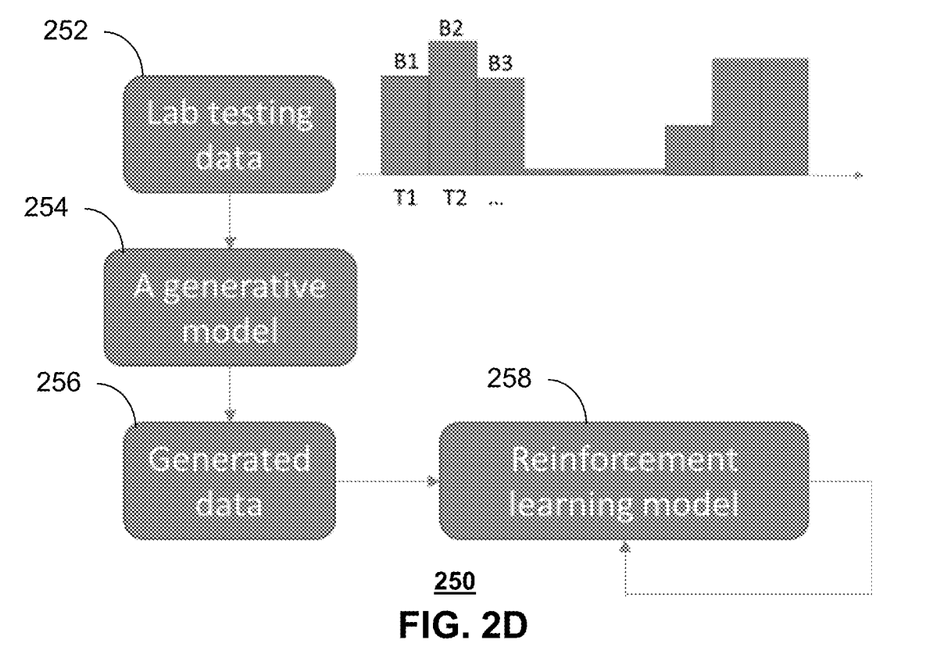
FIG. 2D depicts an illustrative embodiment of a method of creating a reinforcement learning model.

FIG. 2D depicts an illustrative embodiment of a method 250 of creating a reinforcement learning model. As shown in FIG. 2D, in step 252 lab testing data is gathered for training the ML algorithmic models.

In step 254, a generative model is applied to the lab testing data to generate a much larger set of training data, so that these newly generated training data have traffic feature vectors have the same or similar (by adding randomness) statistic properties as the original traffic feature vectors collected from the lab testing. These new generated traffic feature vectors will be used to train the ML models.

In step 256, with the generation of a large sample size and the application of different artificial intelligence (AI)/ML models. In one embodiment, illustrated in FIG. 2D, the generated traffic feature vectors are fed to a reinforcement ML model. In one embodiment, during the training of the AI/ML models, a reward function may provide reinforcement feedback.

In step 258, the reinforcement learning model, trained on the generated data, can be applied to perform the classification, to effectively determine whether the encrypted network traffic flows are associated with a video application.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
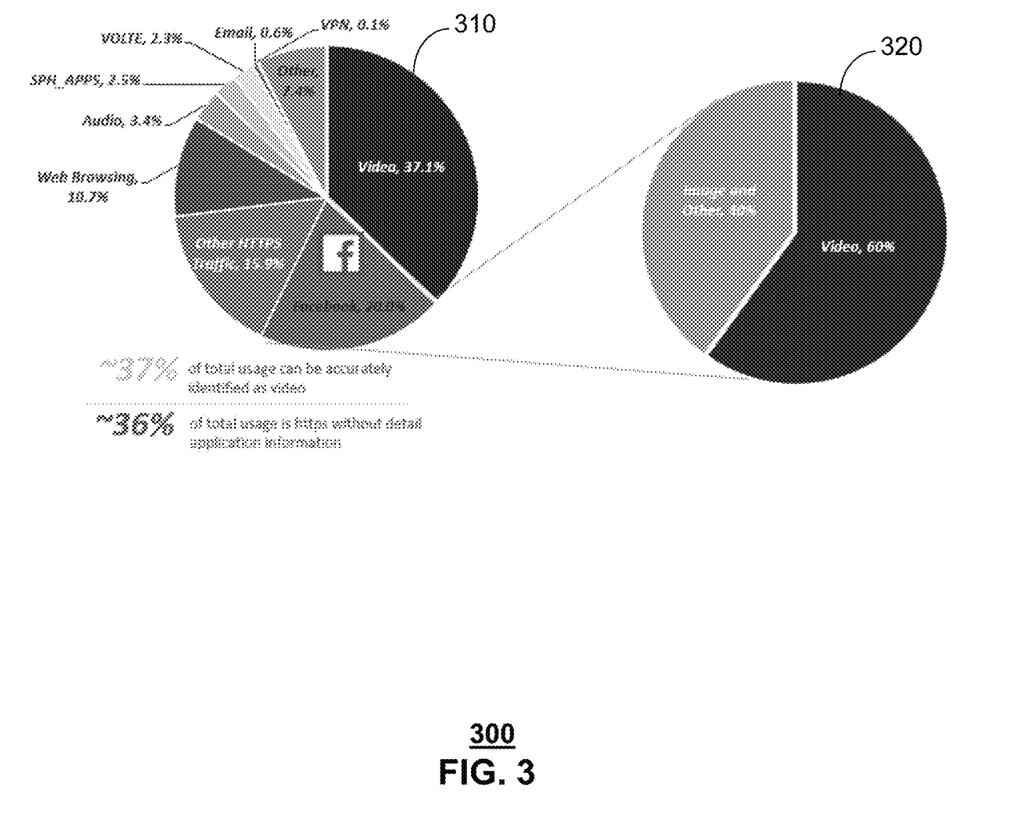
FIG. 3 depicts pie charts illustrating results of the classifier applied to encrypted application traffic.

FIG. 3 depicts pie charts 300 illustrating results of the classifier applied to encrypted application traffic. As shown in the pie chart 310 on the left, 37% of all network traffic can be identified as video traffic from traditional methods. However, encrypted HTTPS based traffic from FACEBOOK® accounts for 36% of the network traffic that does not reveal application information that can be successfully classified into video and non-video traffic. The pie chart 320 on the right indicates that 60% of that encrypted traffic can be classified as video traffic, which would not have been detected without the classifier. The precision, recall, F1 and F2 scores of the classifier are more than 86% and total accuracy is more than 95%. Thus, for every 100 encrypted network traffic flows from FACEBOOK® applications, more than 95 of the encrypted network traffic flows can be correctly classified as either video or non-video. This result provides crucial information to any network planning team working on the network traffic trending and forecasting. In addition, by correctly identifying the traffic type, it enables an ISP to characterize the performance of all OTT videos in the network, and creates opportunities to deliver quality video services together with bandwidth efficient strategies. The framework can be easily extended to other (and new) OTT applications in the existing LTE and future 5G networks, and to non-video applications (i.e., web-browsing vs. app) as well.

Figure 4:
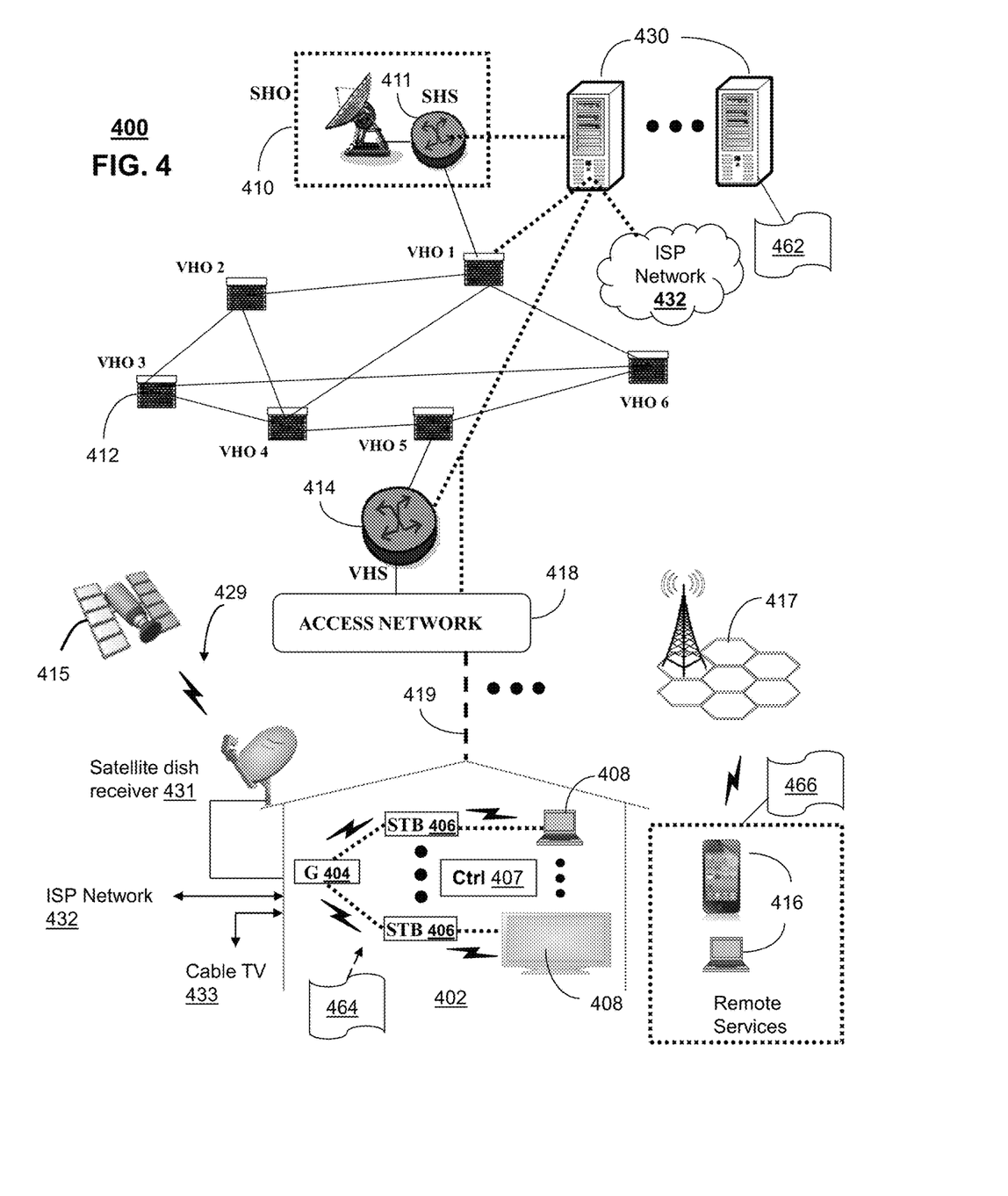
FIGS. 4-5 depict illustrative embodiments of communication systems that provide media services in which applications can be identified.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with system 100 and 210 of FIGS. 1 and/or 2B as another representative embodiment of communication system 400. For instance, one or more devices illustrated in the communication system 400 of FIG. 4 can act as a packet inspection device described above.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (Wi-Fi), BLUETOOTH®, ZIGBEE®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a packet inspection device (herein referred to as packet inspection device 430). The packet inspection device 430 can use computing and communication technology to perform function 462, which can include among other things, the application type detection techniques described by method 250 of FIG. 2D. For instance, function 462 of packet inspection device 430 can be similar to the functions described for packet inspection device 130 of FIG. 1 or packet inspection device 230 of FIG. 2B in accordance with method 250 of FIG. 2D. The media processors 406 and wireless communication devices 416 can be provisioned with software functions 464 and 466, respectively, to utilize the services of packet inspection device 430. For instance, functions 464 and 466 of media processors 406 and wireless communication devices 416 can be similar to the functions described for the communication devices 116 of FIG. 1.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
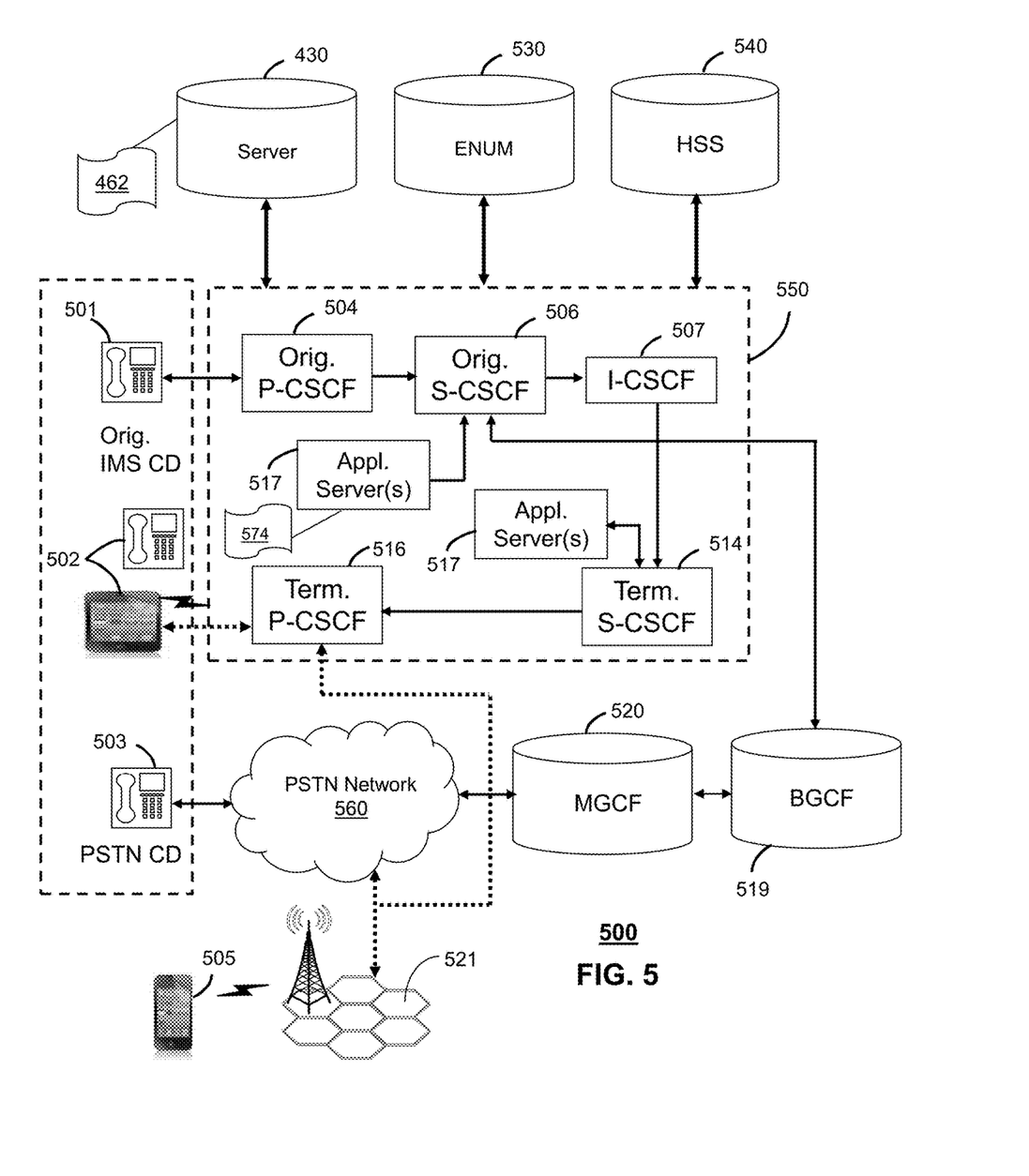

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a Wi-Fi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The packet inspection device 430 of FIG. 4 can be operably coupled to communication system 500 for purposes similar to those described above. Packet inspection device 430 can perform function 462 and thereby provide application type detection services to the network serving CDs 501, 502, 503 and 505 of FIG. 5 similar to the functions described for packet inspection device 230 of FIG. 2B in accordance with method 250 of FIG. 2D. Packet inspection device 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
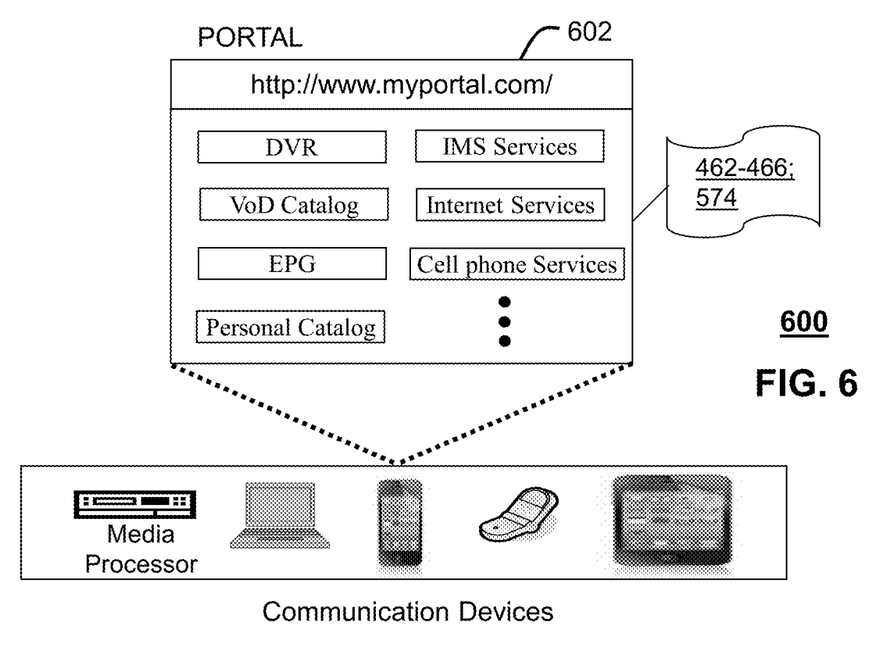
FIG. 6 depicts an illustrative embodiment of a web portal for interacting with the communication systems of FIGS. 1, 2B, 4 and 5.

FIG. 6 depicts an illustrative embodiment of a web portal 602 of a communication system 600. Communication system 600 can be overlaid or operably coupled with systems 100 and 210 of FIGS. 1 and/or 2B, communication system 400, and/or communication system 500 as another representative embodiment of 100 and 210 of FIGS. 1 and/or 2B, communication system 400, and/or communication system 500. The web portal 602 can be used for managing services of 100 and 210 of FIGS. 1 and/or 2B, and communication systems 400-500. A web page of the web portal 602 can be accessed by a Uniform Resource Locator (URL) with an Internet browser using an Internet-capable communication device such as those described in FIGS. 1 and 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 574 to adapt these applications as may be desired by subscribers and/or service providers of systems 100 and 210 of FIGS. 1 and/or 2B, and communication systems 400-500. Service providers can log onto an administrator account to provision, monitor and/or maintain the systems 100 and 210 of FIGS. 1 and/or 2B or server 430.

Figure 7:
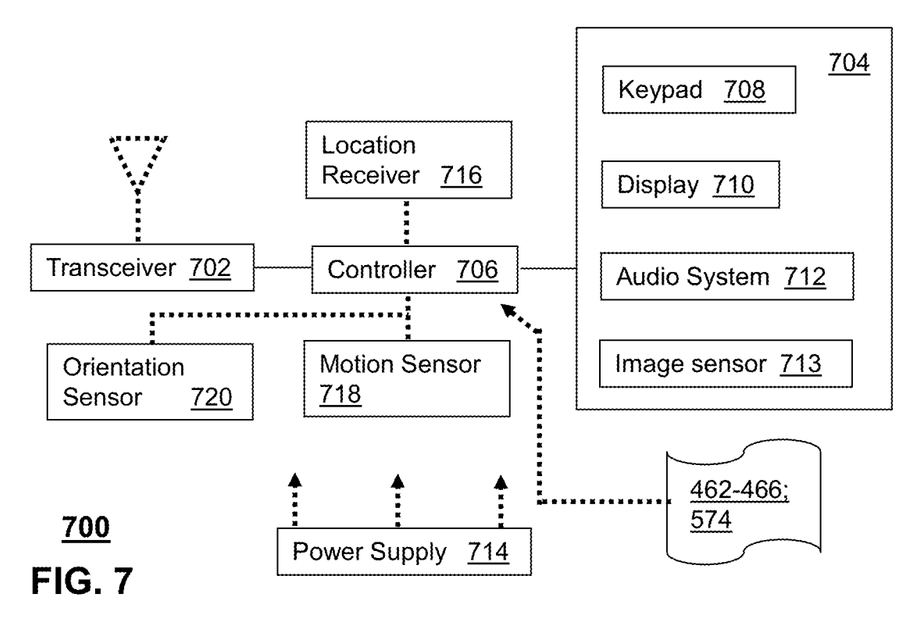
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 4-5 and can be configured to perform portions of method 250 of FIG. 2D.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as BLUETOOTH®, ZIGBEE®, Wi-Fi, DECT, or cellular communication technologies, just to mention a few (BLUETOOTH® and ZIGBEE® are trademarks registered by the BLUETOOTH® Special Interest Group and the ZIGBEE® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example BLUETOOTH®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, Wi-Fi, BLUETOOTH®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of communication devices 116 of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100 and 210 of FIGS. 1 and/or 2B, communication systems 400-500 of FIGS. 4-5 such as a gaming console and a media player. In addition, the controller 706 can be adapted in various embodiments to perform the functions 462-466 and 574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
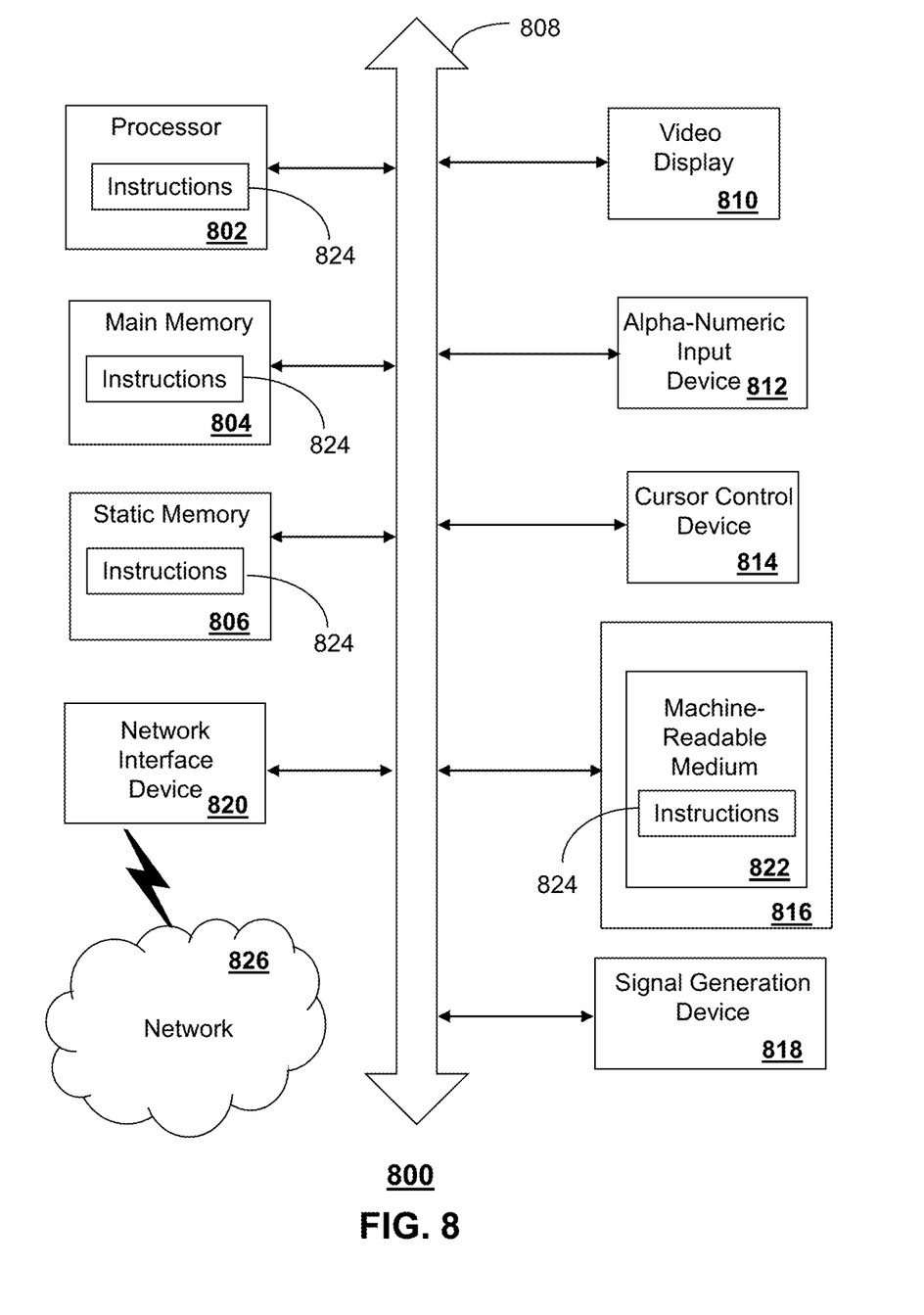
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the packet inspection devices 130, 230 and/or 430, the media processor 406, the Internet server 150, the communication devices 116, and other devices of FIGS. 1, 2B and 4-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions

824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML and HTTP) represent examples of the state of the art. Such standards are from time-to-time superseded by faster or more efficient equivalents having essentially the same functions. Wireless standards for device detection (e.g., RFID), short-range communications (e.g., BLUETOOTH®, Wi-Fi, ZIGBEE®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
collecting encrypted network traffic flow data from user interaction with an application;
deriving a first set of traffic feature vectors from the encrypted network traffic flow data that is collected, wherein each traffic feature vector in the first set of traffic feature vectors is derived from a plurality of traffic counters, and wherein one traffic counter of the plurality of traffic counters corresponds to a service provider that provides wireless access;
applying a generative model to the first set of traffic feature vectors to generate a second set of traffic feature vectors, wherein the second set of traffic feature vectors has statistic properties that are the same as statistic properties of the first set of traffic feature vectors, wherein the second set of traffic feature vectors is larger than the first set of traffic feature vectors, and wherein the second set of traffic feature vectors includes the first set of traffic feature vectors;
training a machine learning algorithm on the second set of traffic feature vectors to classify each traffic feature vector in the second set of traffic feature vectors as associated with a type of the application or not associated with the type of the application; and
classifying whether an encrypted network traffic flow is associated with the type of the application by applying the machine learning algorithm to a traffic feature vector of the encrypted network traffic flow.

2. The device of claim 1, wherein each of a plurality of other traffic counters of the plurality of traffic counters corresponds to a domain name, a flow size, a flow duration, a flow throughput, a periodic traffic pattern, a transport control protocol flag info, or a combination thereof.

3. The device of claim 2, wherein the operations further comprise mapping the one traffic counter and each of the other traffic counters to a traffic feature vector.

4. The device of claim 3, wherein the mapping applies signature processing to the one traffic counter and each of the plurality of other traffic counters to create the first set of traffic feature vectors.

5. The device of claim 4, wherein the signature processing comprises a fast Fourier transform.

6. The device of claim 1, wherein a reward function trains the machine learning algorithm.

7. The device of claim 1, wherein the processor comprises a plurality of processors operating in a distributed processing environment.

8. The device of claim 1, wherein the type of the application comprises a video application.

9. A non-transitory machine-readable medium comprising executable instructions that, when executed by a processing system including a processor, facilitate performance of operations, the operations comprising:
collecting encrypted network traffic flow data from user interaction with an application;
deriving a first set of traffic feature vectors from the encrypted network traffic flow data that is collected, wherein the encrypted network traffic flow data comprises a type of application, wherein each traffic feature vector in the first set of traffic feature vectors is derived from a plurality of traffic counters, and wherein one traffic counter of the plurality of traffic counters corresponds to a service provider that provides wireless access;
applying a generative model to the first set of traffic feature vectors to generate a second set of traffic feature vectors, wherein the second set of traffic feature vectors has statistic properties that are the same as statistic properties of the first set of traffic feature vectors, wherein the second set of traffic feature vectors is larger than the first set of traffic feature vectors, and wherein the second set of traffic feature vectors includes the first set of traffic feature vectors;

training a machine learning algorithm on the second set of traffic feature vectors to classify each traffic feature vector in the second set of traffic feature vectors as associated with the type of application or not associated with the type of application; and classifying whether an encrypted network traffic flow is associated with the type of application by applying the machine learning algorithm to a traffic feature vector of the encrypted network traffic flow.

10. The non-transitory machine-readable medium of claim 9, wherein the deriving comprises mapping the one traffic counter and each of a plurality of other traffic counters onto each traffic feature vector in the first set of traffic feature vectors, and wherein each of the traffic counters is created from the encrypted network traffic flow data.

11. The non-transitory machine-readable medium of claim 10, wherein each of the plurality of other traffic counters corresponds to a domain name, a flow size, a flow duration, a flow throughput, a periodic traffic pattern, a transport control protocol flag info, or a combination thereof.

12. The non-transitory machine-readable medium of claim 10, wherein the mapping comprises applying signature processing to the one traffic counter and to each of the plurality of other traffic counters to derive the first set of traffic feature vectors.

13. The non-transitory machine-readable medium of claim 12, wherein the signature processing comprises a fast Fourier transform.

14. The non-transitory machine-readable medium of claim 9, wherein the application comprises a video application, wherein a reward function trains the machine learning algorithm, and wherein the processor comprises a plurality of processors operating in a distributed processing environment.

15. A method, comprising:
receiving, by a processing system including a processor, encrypted network traffic flow data from user interaction with a video application;

determining, by the processing system, a first set of traffic feature vectors from the encrypted network traffic flow data that is collected, wherein each traffic feature vector in the first set of traffic feature vectors is derived from a plurality of traffic counters, and wherein one traffic counter of the plurality of traffic counters corresponds to a service provider that provides wireless access;

applying, by the processing system, a generative model to the first set of traffic feature vectors to generate a second set of traffic feature vectors, wherein the second set of traffic feature vectors has statistic properties that are the same as statistic properties of the first set of traffic feature vectors, wherein the second set of traffic feature vectors is larger than the first set of traffic feature vectors, and wherein the second set of traffic feature vectors includes the first set of traffic feature vectors;

training, by the processing system, a machine learning algorithm on the second set of traffic feature vectors to classify each traffic feature vector in the second set of traffic feature vectors as associated with the video application or not associated with the video application; and classifying, by the processing system, whether an encrypted network traffic flow is associated with the video application by applying the machine learning algorithm to a traffic feature vector of the encrypted network traffic flow.

16. The method of claim 15, wherein a reward function trains the machine learning algorithm.

17. The method of claim 15, wherein each of a plurality of other traffic counters of the plurality of traffic counters corresponds to a domain name, a flow size, a flow duration, a flow throughput, a periodic traffic pattern, a transport control protocol flag info, or a combination thereof.

18. The method of claim 17, further comprising mapping, by the processor, the one traffic counter and each of the other traffic counters to a traffic feature vector.

19. The method of claim 18, wherein the mapping applies signature processing to the one traffic counter and each of the plurality of other traffic counters to create the first set of traffic feature vectors.

20. The method of claim 15, wherein the processor comprises a plurality of processors operating in a distributed processing environment.

* * * * *